(No Model.) 4 Sheets—Sheet 1.
J. PATTEN.
METHOD OF AND APPARATUS FOR SEPARATING VAPORS FROM FOAMING CONCENTRATED SOLUTIONS.
No. 447,258. Patented Feb. 24, 1891.
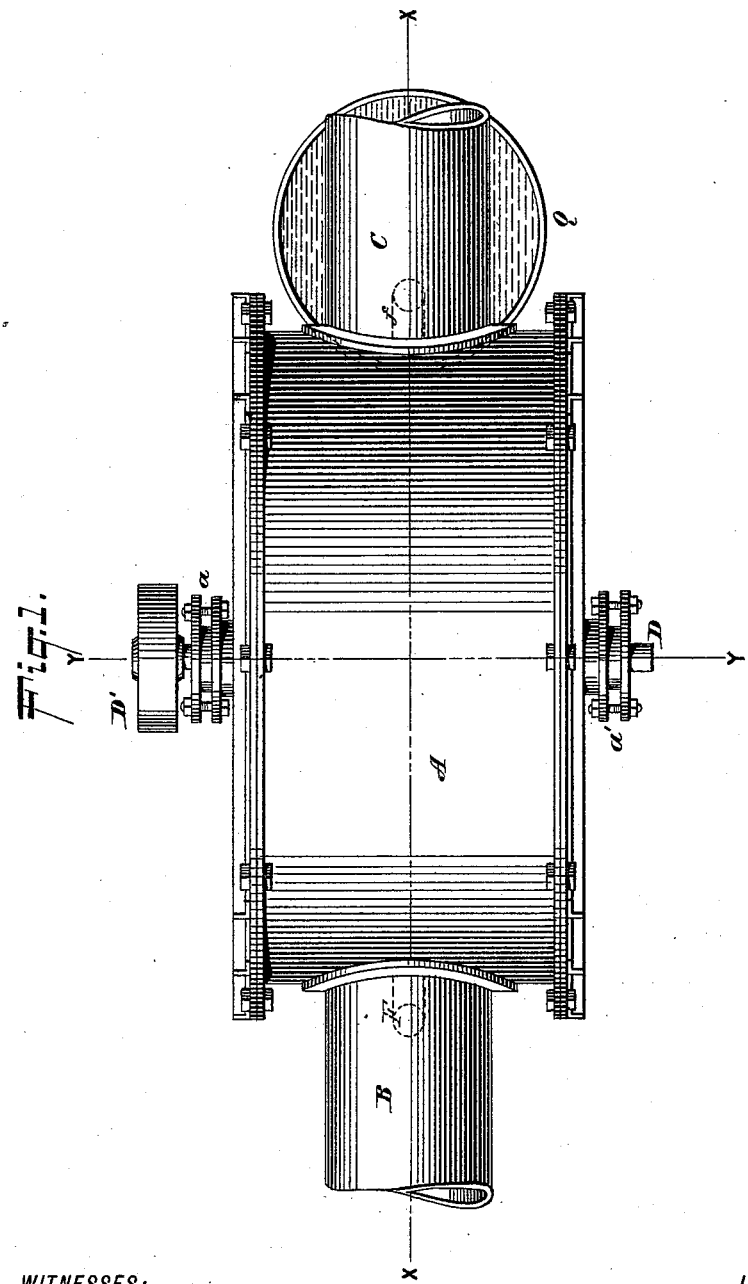

(No Model.) 4 Sheets—Sheet 2.
J. PATTEN.
METHOD OF AND APPARATUS FOR SEPARATING VAPORS FROM FOAMING CONCENTRATED SOLUTIONS.
No. 447,258. Patented Feb. 24, 1891.
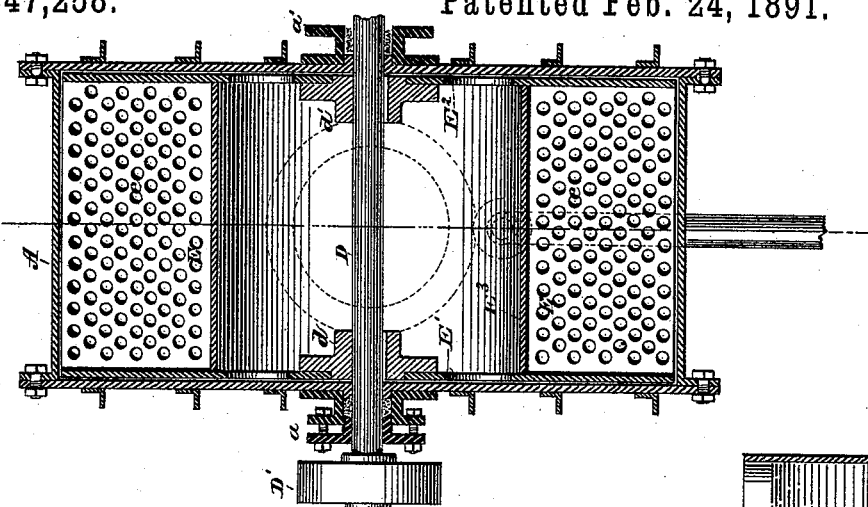
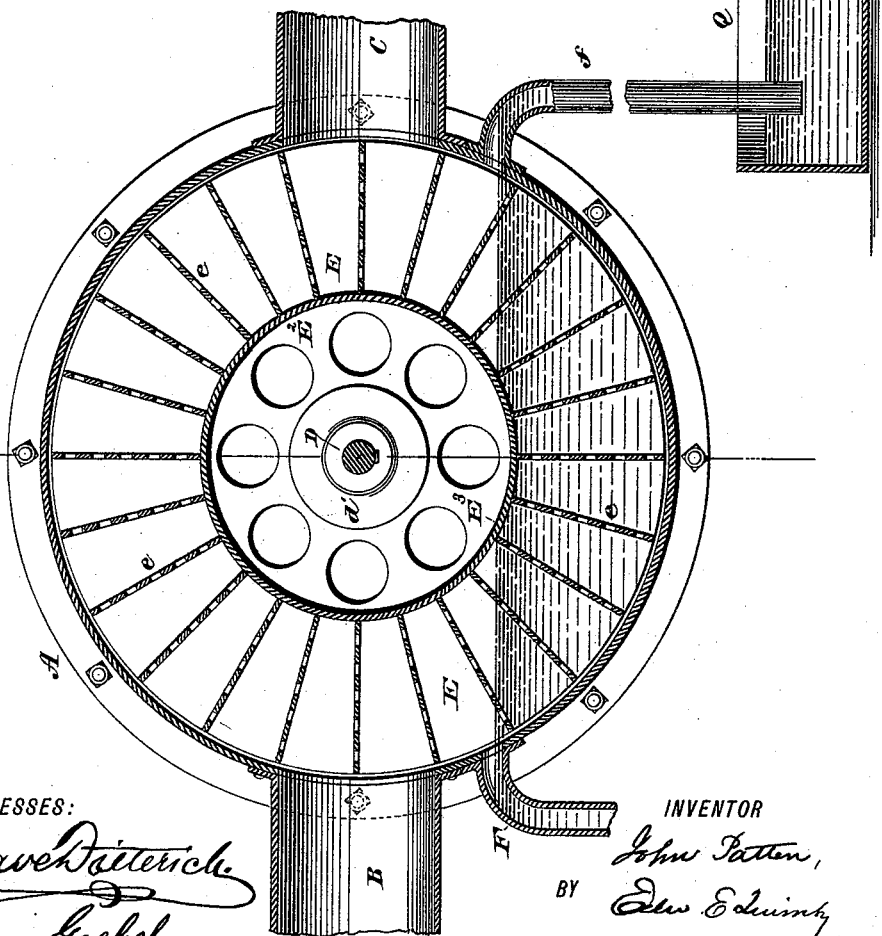
WITNESSES:
Gustave Dieterich
William Goebel.
INVENTOR
John Patten,
BY Edw E Quinby
ATTORNEY.

(No Model.) 4 Sheets—Sheet 3.
J. PATTEN.
METHOD OF AND APPARATUS FOR SEPARATING VAPORS FROM FOAMING CONCENTRATED SOLUTIONS.
No. 447,258. Patented Feb. 24, 1891.
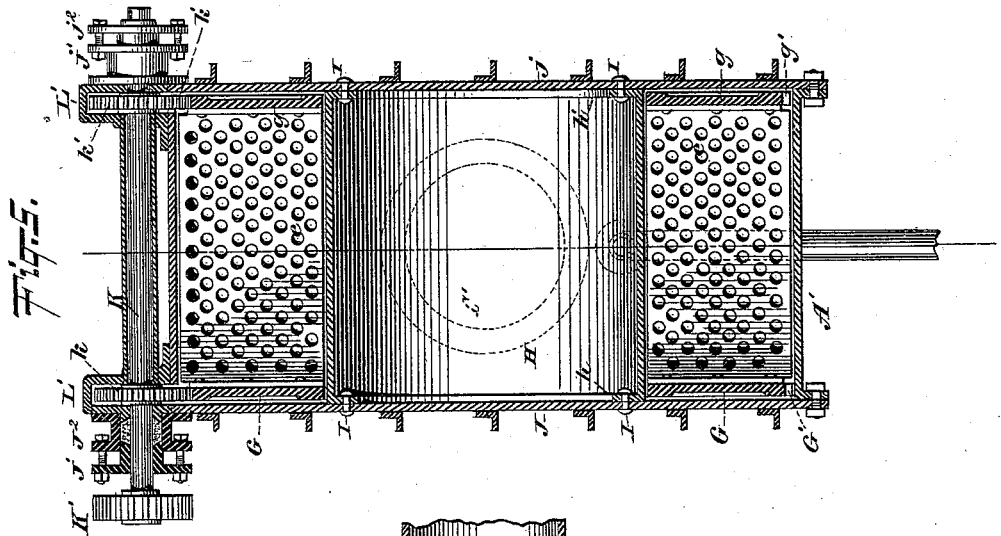
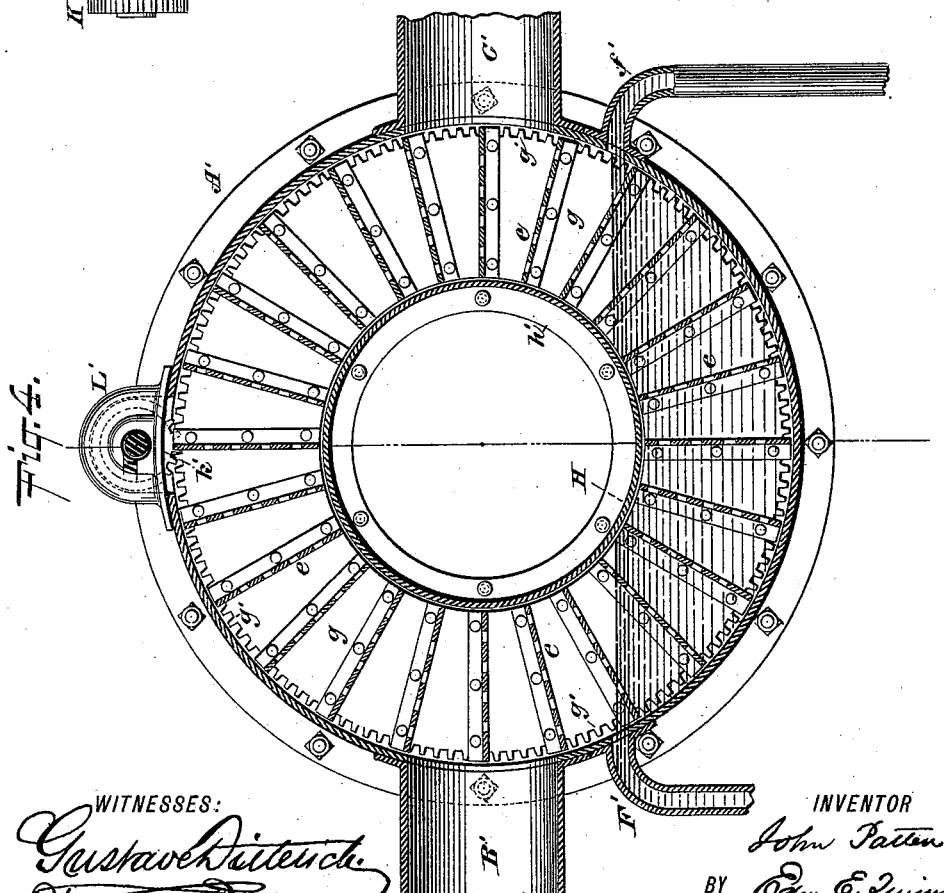
WITNESSES:
Gustave Dieterich
William Goebel.
INVENTOR
John Patten,
BY Edw. E. Quinby,
ATTORNEY.

(No Model.) 4 Sheets—Sheet 4.
J. PATTEN.
METHOD OF AND APPARATUS FOR SEPARATING VAPORS FROM FOAMING CONCENTRATED SOLUTIONS.
No. 447,258. Patented Feb. 24, 1891.
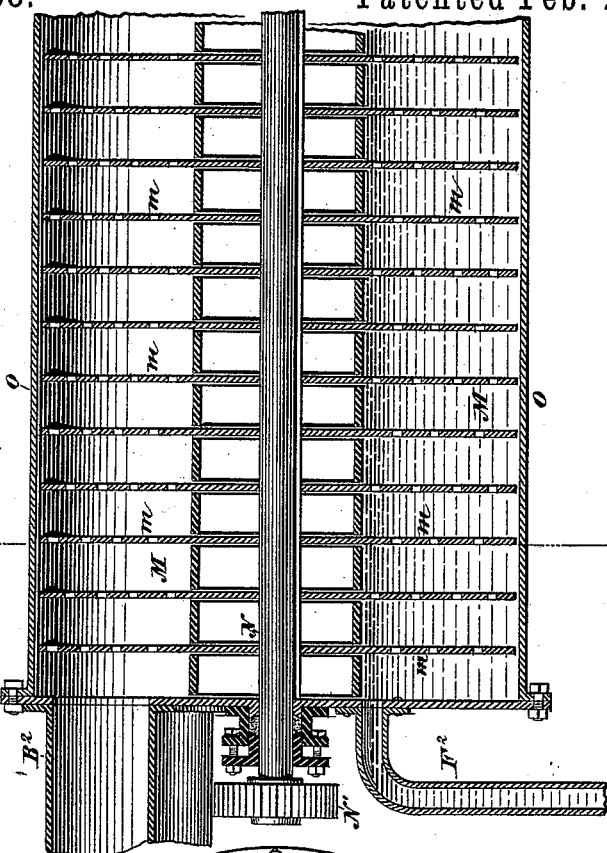
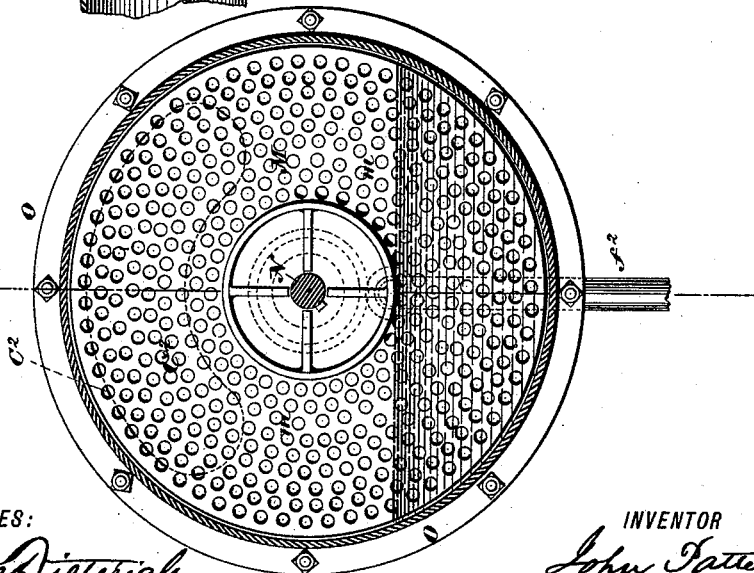
WITNESSES:
Gustave Dieterich
William Goebel.
INVENTOR
John Patten
BY Edw. E. Quimby
ATTORNEY.

UNITED STATES PATENT OFFICE.

JOHN PATTEN, OF NEW YORK, N. Y., ASSIGNOR TO THE JOHN PATTEN MANUFACTURING COMPANY, OF NEW YORK.

METHOD OF AND APPARATUS FOR SEPARATING VAPORS FROM FOAMING CONCENTRATED SOLUTIONS.

SPECIFICATION forming part of Letters Patent No. 447,258, dated February 24, 1891.

Application filed April 25, 1890. Renewed January 19, 1891. Serial No. 378,327. (No model.)

*To all whom it may concern:*

Be it known that I, JOHN PATTEN, of the city and State of New York, have invented certain Improvements in a Method of and Apparatus for Separating Vapors from Foaming Concentrated Solutions, of which the following is a specification.

The vapor rising from solutions which are being heated for the purpose of concentration frequently carries off in bubbles small portions of the heated liquor. Drops of concentrated sugar-liquor are sometimes thus carried off in the vapor rising from the vacuum-pans employed in sugar-refineries. Drops of liquid have heretofore been sifted out of the vapor in which they were carried by causing such vapor to pass through a so-called "scrubbing-chamber" provided with a series of perforated plates, against the unperforated portion of which the drops of liquid strike, and, adhering thereto, fall to the bottom of the scrubbing-chamber.

In dealing with a highly-concentrated liquid containing a salt which crystallizes readily there is a liability that the salt will adhere to and crystallize upon the surface of the scrubbing-plates and ultimately clog the passages through which the vapor is intended to pass. It is the object of the method and apparatus embraced in the present invention to guard against this difficulty.

The method by which the desired result is accomplished involves the employment of a movable system of scrubbing-plates; and it consists, broadly, in intermittingly immersing the scrubbing-plates or successive portions thereof in a bath of thin liquor, preferably of the same character as that which is undergoing concentration, and thereby washing and dissolving off from the surfaces of the scrubbing-plates any thick liquid or salt which may have become adherent thereto immediately prior to such immersion. The liquid thus employed is hereinafter called the "washing-liquid."

The apparatus consists of a series of perforated plates mounted and made to slowly revolve upon a common horizontal axis within a chamber, the lower portion of which is kept supplied with the washing-liquid, while the upper portion of the chamber is concentric with the axis of revolution of the perforated plates and constitutes the path through which the vapor is conducted from the induction-pipe upon one side to the eduction-pipe upon the other side of the chamber. Those portions of the rotating system of perforated plates (hereinafter called "scrubbing-plates") which are traveling through the upper part of their orbit project into the path of the vapor through the scrubbing-chamber, and in traveling through the lower part of their orbit are immersed in the liquid contained in the lower portion of the scrubbing-chamber. By such immersion any salt or highly-concentrated liquid which may have adhered to the scrubbing-plates is dissolved and washed off. The thin liquid in the bottom of the scrubbing-chamber is pumped in at one side and flows out at the other side, so that it is being constantly changed. Inasmuch as a partial vacuum is maintained in the scrubbing-chamber, the overflow-pipe for the washing-liquid is conducted downward a distance of thirty-three feet, more or less, and terminates at its lower end beneath the surface of a body of liquid contained in a suitably-large cistern. By this device the body of liquid in the cistern is made to act as a seal, which prevents atmospheric air from being sucked into the scrubbing-chamber through the overflow-pipe, the height of the overflow-pipe being sufficient to permit a Torricellian vacuum to be maintained in the scrubbing-chamber.

This improvement has a wide range of usefulness and may be successfully employed for separating the vapors from the foam arising from any more or less concentrated solution containing a crystallizable constituent or constituents. The necessity which has heretofore existed in some cases for arresting the scrubbing operation in order to clean off the scrubbing-plates, or to remove the crystallized material from the scrubbing-chamber, is entirely avoided by the use of the improved apparatus herein described, which can be worked continuously, because any thick liquid or solid matters deposited upon the scrubbing-plates are continuously washed therefrom and dissolved and carried out of the scrubbing-chamber by the liquid bath in which the rotating system of scrubbing-plates is immersed during its travel through the lower portion of its orbit.

The accompanying drawings of scrubbing apparatus embodying the invention in simple forms are as follows:

Figures 1, 2, and 3 illustrate a form of scrubbing apparatus in which there is employed a rotating system of radially-grouped scrubbing-plates mounted upon a central shaft, to which the necessary driving-power is applied. Of these Fig. 1 is a top view. Fig. 2 is a central vertical section taken through the plane indicated by the line $x\,x$ on Fig. 1. Fig. 3 is a vertical section taken through the vertical plane of the axis of the shaft and indicated by the dotted line $y\,y$ on Fig. 1. Figs. 4 and 5 are vertical sections illustrating a modification of the apparatus in which the rotating system of radially-grouped scrubbing-plates is driven by power applied to the peripheries of the annular plates, to which the radially-grouped plates are secured. Figs. 6 and 7 are respectively longitudinal and transverse vertical sections illustrating another modification in which the scrubbing-plates consist of perforated disks equidistantly mounted upon a horizontal shaft rotated within a cylindrical scrubbing-chamber.

The drawings represent the improvement embodied in simple forms of apparatus, which, as will of course be understood, may be varied in dimensions according to the volume of vapor which is to be dealt with.

The form of apparatus illustrated in Figs. 1, 2, and 3 consists of a scrubbing-chamber in the form of a comparatively short cylinder A, which, for the sake of illustration, may be assumed to have a diameter of eight feet and an axial length of four feet. The vapor-induction pipe B, having a diameter of, say, two feet, is inserted in the curved shell of the cylinder on one side, and the vapor-eduction pipe C, of like diameter, is inserted in the curved shell of the cylinder on the other side. The vertical walls of the cylinder are respectively provided with the stuffing-boxes $a\,a'$ to receive the gland-packing for the shaft D, which extends through the cylinder A, and upon which is mounted the rotating system E of scrubbing-plates contained within the cylinder A. The shaft D may have affixed to its projecting outer end a pulley D', to enable the rotating system to be driven by a belt, or it may have affixed to it a pinion adapted for engagement with a spur-wheel for driving the rotating system, or, if the apparatus is of very large size, it may be found preferable to drive the shaft with the worm-gear. The scrubbing-plates $e$, composing the rotating system E, are secured at their sides, respectively, to the two light wheels or disks E' E², which are centrally affixed, respectively, to the hubs $d\,d'$, keyed to the driving-shaft D. The inner edges of the scrubbing-plates bear or nearly bear against the exterior of a drum E³, concentrically fastened to the wheels or disks E' E². The lower portion of the scrubbing-chamber is kept supplied with the liquid, in which the scrubbing-plates are successively immersed during their revolution by means of the service-pipe F. The said liquid, which for present convenience may be called the "washing-liquid," is forced through the service-pipe either by means of a pump or by the connection of the service-pipe with a suitably elevated reservoir. The depth of the washing-liquid in the lower part of the scrubbing-chamber is intended to be slightly greater than the width in a radial direction of a single scrubbing-plate $e$. The washing-liquid, constantly delivered into the scrubbing-chamber through the service-pipe F, is discharged therefrom through the overflow-pipe $f$, the lower end of which terminates beneath the surface of a body of liquid Q, contained in a cistern situated thirty-three feet (more or less) below the scrubbing-chamber.

The construction illustrated in Figs. 4 and 5 is well adapted for apparatus of very large size, in which special provision must be made to enable the walls of the scrubbing-chamber to sustain external atmospheric pressure without deflection. In this case the rotating system embraces two annular plates G $g$, provided upon their peripheries with the teeth G' $g'$, and bearing upon the surface of the smaller cylinder H, which is provided at its opposite ends with the inwardly-turned flanges $h\,h'$, by means of which it is securely fastened by the series I of bolts to the overlapping edges of the annular vertical side walls J $j$ of the larger cylinder A'. The vapor-induction pipe B' is inserted in the curved shell of the cylinder A' on one side, and the vapor-eduction pipe C' is inserted in the curved shell of the cylinder on the other side. The radially-arranged perforated plates $e$ are provided at their sides with lateral flanges, by the aid of which they are bolted to the annular plates G $g$. The required circulation of the washing-liquid is maintained by means of the service-pipe F' and escape-pipe $f'$. The rotating system in this case is driven by means of a counter-shaft K, provided with bearings in the stuffing-boxes J' J² $j'\,j^2$, and having affixed to it the spur-wheels $k\,k'$ for engaging the teeth G $g'$ upon the peripheries of the annular plates G $g$, respectively. The spur-wheels $k\,k'$ are covered by the hoods L' L', fastened to the outer shell of the cylinder A, as shown. The externally-projecting portion of the shaft K is provided with the pinion K', to which power is applied to drive the rotating structure.

In the modification illustrated in Figs. 6 and 7 the system of scrubbing-plates consists of a group M of perforated disks $m$, equidistantly mounted upon a horizontal shaft N, provided with bearings in the heads of the comparatively long cylindrical scrubbing-chamber O, the lower part of which contains the liquid in which the lower portions of the perforated disks are immersed, the said liquid being introduced at one end through the service-pipe F² and allowed to overflow at the other end through the escape-pipe f².

Power to drive the rotating structure is applied by means of a spur-wheel engaging the pinion N', affixed to the projecting outer end of the shaft N. The induction-pipe B² and the eduction-pipe C² at their points of junction with the heads of the scrubbing-chamber may be made approximately crescent-shaped in cross-section, if necessary, to afford clearance for the shaft N and its journals.

It will of course be understood that in any case the system of scrubbing-plates, instead of being continuously rotated in one direction, may have a vibratory motion imparted to it, and that the essential feature of the invention is that the scrubbing-plates, or portions of them, are successively immersed in the washing-liquid at the bottom of the scrubbing-chamber, then withdrawn therefrom and projected into the path along which the vapor makes its way through the scrubbing-chamber, so that by the inherent law of operation of the apparatus the scrubbing-plates are self-cleaning.

What is claimed as the invention is—

1. The herein-described method of preventing the clogging of scrubbing apparatus used for separating vapor from foaming concentrated solutions, which consists in at intervals washing the surfaces of the scrubbing-plates, which are made to intersect the path along which the vapor flows across the scrubbing-chamber, by successively immersing all portions of the system of scrubbing-plates in a thin washing-liquid of the same character as the solution which is undergoing concentration.

2. In a scrubbing apparatus for separating vapors from foaming concentrated solutions, and in which a more or less high vacuum is required to be maintained, the combination, as herein set forth, of a scrubbing-chamber, a rotating system of scrubbing-plates contained within said chamber, vapor induction and eduction pipes appropriately connected with said chamber, a service-pipe for supplying washing-liquid to said chamber, a cistern situated thirty-three feet (more or less) below said chamber, and an overflow-pipe for conducting said washing-liquid from said chamber downward into and beneath the surface of a body of similar liquid contained in said cistern.

JOHN PATTEN.

Witnesses:
A. M. JONES,
E. L. CARY.